(12) United States Patent
Wells et al.

(10) Patent No.: US 7,001,686 B2
(45) Date of Patent: Feb. 21, 2006

(54) PROCESS FOR FORMING AN INTEGRAL GASKET ON A BIPOLAR PLATE FOR A PEM FUEL CELL

(75) Inventors: Allan R. Wells, Rochester, NY (US); Gary J. DeAngelis, Spencerport, NY (US); Arthur R. Williams, Spencerport, NY (US); Carolyn Fleming, Lima, NY (US)

(73) Assignee: Delphi Technologies, Inc., Troy, MI (US)

( * ) Notice: Subject to any disclaimer, the term of this patent is extended or adjusted under 35 U.S.C. 154(b) by 397 days.

(21) Appl. No.: 10/256,770

(22) Filed: Sep. 27, 2002

(65) Prior Publication Data

US 2004/0062976 A1    Apr. 1, 2004

(51) Int. Cl.
    *H01M 2/08*    (2006.01)
(52) U.S. Cl. .................... 429/36; 156/64; 156/350; 429/35
(58) Field of Classification Search ............ 429/35–36; 156/64
    See application file for complete search history.

(56) References Cited

U.S. PATENT DOCUMENTS

| | | | | |
|---|---|---|---|---|
| 4,175,165 A | * | 11/1979 | Adlhart | .................. 429/30 |
| 4,247,510 A | * | 1/1981 | Desverchere | ............... 264/236 |
| 4,759,810 A | * | 7/1988 | Jackson et al. | ................ 156/64 |
| 5,484,503 A | * | 1/1996 | Grot | ............................ 156/333 |
| 5,536,342 A | * | 7/1996 | Reis et al. | ..................... 156/64 |
| 6,321,145 B1 | | 11/2001 | Rajashekara | |
| 6,423,896 B1 | | 7/2002 | Keegan | |
| 6,455,185 B1 | | 9/2002 | Bircann et al. | |
| 6,485,852 B1 | | 11/2002 | Miller et al. | |
| 6,509,113 B1 | | 1/2003 | Keegan | |
| 6,551,734 B1 | | 4/2003 | Simpkins et al. | |
| 6,562,496 B1 | | 5/2003 | Faville et al. | |
| 6,608,463 B1 | | 8/2003 | Kelly et al. | |
| 6,613,468 B1 | | 9/2003 | Simpkins et al. | |
| 6,613,469 B1 | | 9/2003 | Keegan | |
| 6,627,339 B1 | | 9/2003 | Haltiner, Jr. | |
| 6,630,264 B1 | | 10/2003 | Haltiner, Jr. et al. | |

* cited by examiner

*Primary Examiner*—Mark Ruthkosky
(74) *Attorney, Agent, or Firm*—Paul L. Marshall

(57) ABSTRACT

A method for attaching a gasket to a non-gasketed bipolar plate for a PEM fuel cell, including the steps of making a pattern of the gasket; preparing the bipolar plate surface; priming the bipolar plate surface for adhesive according to the gasket pattern; aging the primer coat; screen-printing an adhesive coat onto the primer according to the gasket pattern; positioning the gasket face-down in a mirror-image fixture having channels in the form of the gasket; positioning the bipolar plate face down onto the fixture and gasket; applying pressure to the plate to adhere the gasket thereto in the adhesive-coated areas; removing the plate and gasket subassembly from the fixture; and curing the adhesive to provide a gasketed bipolar plate.

17 Claims, 1 Drawing Sheet

PROCESS FOR FORMING AN INTEGRAL GASKET ON A BIPOLAR PLATE FOR A PEM FUEL CELL

TECHNICAL FIELD

The present invention relates to proton-exchange membrane (PEM) fuel cells; more particularly, to a bipolar plate for a PEM fuel cell; and most particularly, to an improved process for laminating a gasket onto a surface of a bipolar plate.

BACKGROUND OF THE INVENTION

Proton-exchange membrane fuel cells are well known. In a PEM fuel cell, hydrogen atoms are ionized in an anode, migrate through a specialized membrane as hydrogen cations (protons), and combine with oxygen anions at a cathode to form water. Electrons from the hydrogen flow from the anode through an external circuit to the cathode, performing work in between.

Fuel cell assemblies comprise a plurality of individual fuel cells stacked together and connected in electrical series. An interconnect element electrically connects the anode and cathode of adjacent fuel cell assemblies. For ease of manufacture, it is typical to employ the interconnect element as a structural member and to apply an anode and membrane to one side and a cathode to the other side, forming what is known in the art as a "bipolar plate." Such bipolar plates, when stacked together, cathode of one against the membrane of the next, form a fuel cell assembly. Openings through the plates near the edges form headers for inlet and exhaust of fuel and combustion gases. Other openings may be provided for alignment during assembly or for other specialized purposes.

The plates require a seal or gasket along all outer edges and around all openings to prevent leaking of reactant gases and coolant. It is known to use separate die-cut or molded rubber gaskets, installed between the plates during assembly of a fuel cell stack. However, a serious problem exists in locating the gaskets properly with respect to the openings to be sealed. A misaligned gasket can cause leaks, stack failure, and even broken bipolar plates. Further, using separate gaskets adds significantly to the overall time of stack assembly.

What is needed is a reliable method of laminating gaskets to bipolar plate prior to assembly of the plates into a fuel cell stack.

It is a principal object of the present invention to improve the reliability of assembly of a fuel cell stack.

It is a further object of the invention to reduce waste and cost in fuel cell manufacture.

It is a still further object of the invention to improve ease of assembly of a fuel cell stack.

SUMMARY OF THE INVENTION

Briefly described, as a portion of a method for forming a bipolar plate, a method for attaching a gasket to the plate includes the steps of making a pattern of the gasket; preparing the bipolar plate surface; priming the bipolar plate surface for adhesive according to the gasket pattern; aging the primer coat; screen-printing an adhesive onto the primer according to the gasket pattern; positioning the gasket face-down in a fixture having shallow channels in the form of the gasket; entering the bipolar plate face down onto the fixture and gasket; applying pressure to the plate to adhere the gasket thereto in the adhesive-coated areas; removing the plate and gasket subassembly from the fixture; and curing the adhesive.

BRIEF DESCRIPTION OF THE DRAWINGS

These and other features and advantages of the invention will be more fully understood and appreciated from the following description of certain exemplary embodiments of the invention taken together with the accompanying drawings, in which.

DESCRIPTION OF THE PREFERRED EMBODIMENTS

Figure 1:
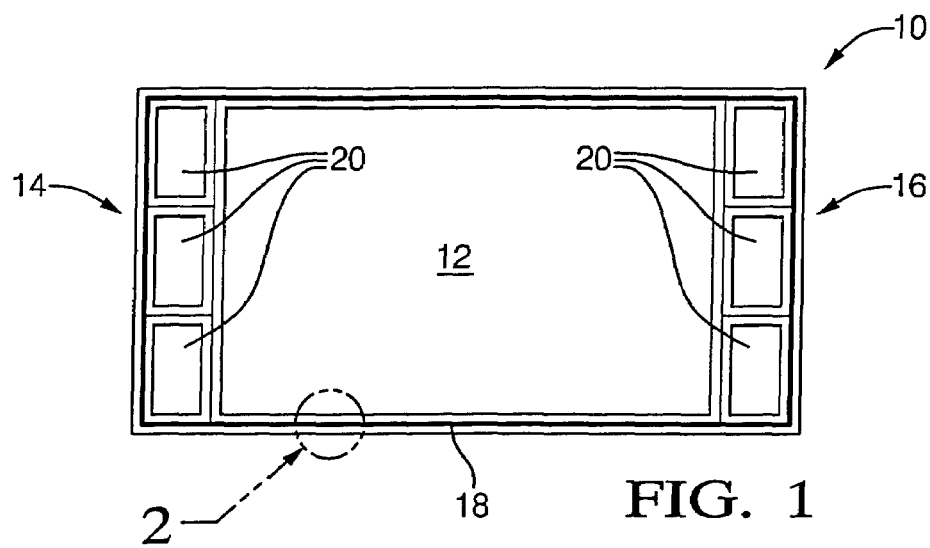
FIG. 1 is a top view of a bipolar plate having a perimeter gasket.

Referring to FIG. 1, a typical bipolar plate 10 for use in a PEM fuel cell can be any shape including, for example, generally rectangular, having a central region 12 for receiving fuel cell electrodes and membrane (not shown) and first and second manifold regions 14,16 for providing fuel and air to the central region in known fashion. Preferably, plate 10 is composed of a graphite filled polymer such as vinyl ester, or a metallic compound of titanium or stainless steel. Plate 10 is provided with a known resilient gasket 18, typically formed independently as a single, continuous element of silicone or of other elastomeric rubber compounds known in the art which surrounds central region 12 and one or more of the apertures 20 in manifold regions 14 and 16.

Figure 2:
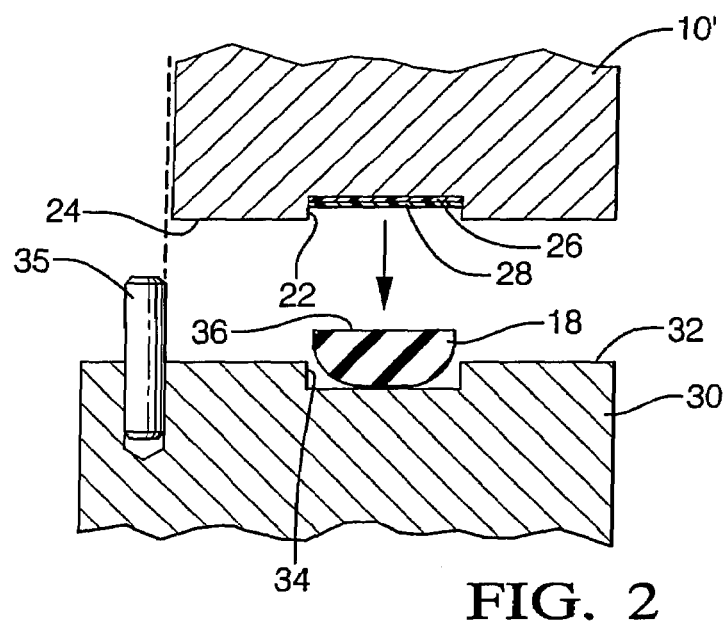
FIG. 2 is a detailed cross-sectional view of a region of the bipolar plate shown in FIG. 1, identified as circle 2, being assembled in accordance with a method of the invention.
Figure 3:
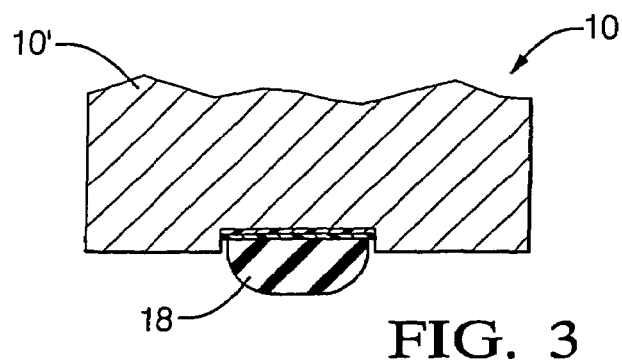
FIG. 3 is a detailed cross-sectional view of the finished gasket assembly.

Referring to FIG. 2, gasket 18 is preferably attached to non-gasketed plate 10' in accordance with the following process of the invention.

A pattern is formed for applying coatings to the surface areas of plate 10' to which gasket 18 is to be adhered, generally as shown in FIG. 1. Preferably, a shallow groove 22 is formed in the surface 24 of plate 10' for receiving gasket 18. Surface preparation of the bottom of groove 22 is important. Loosely adhering graphite and possible oils are removed, preferably by wiping with acetone. Using the prepared pattern, a primer coat 26 is applied manually to the bottom of groove 22 in known fashion and preferably using a silicone-bonding primer such as commercially-available Dow Corning Silgard Primer 1204. Preferably, the primer coat is allowed to age for a period of hours before applying a silicone contact adhesive. It is believed that the primer becomes partially hydrated, optimizing bond strength to the plate and the adhesive.

Selection of the adhesive material is critical. Of paramount importance is that the adhesive must not adversely affect the electrode catalysts. Certain screen-printable polymers including silicone-based polymers were found to be safe for both catalysts and membranes. The adhesive material preferably also has cure characteristics compatible with the bipolar plate assembly. Screen printing also places viscosity limitations on the adhesive. Two compounds, Dow Corning 3140 and OS-30, may be blended as known in the art to meet the full requirements.

An adhesive layer 28 is coated, preferably by screen printing, onto primer coat 26 in the same pattern.

To correctly and reliably bring gasket 18 into contact with adhesive layer 28, a gasket-locating fixture 30 is provided having a mirror image of the same pattern grooved as by machining into its upper surface 32. As shown in FIG. 2, gasket 18 is carefully placed "face down" in groove 34. Fixture 30 is further provided with guide means, for example, locating pins 35 or shoulders, for guiding plate 10' onto gasket 18, thereby engaging gasket base surface 36 onto adhesive layer 28 uniformly over the entire gasketed area of plate 10'. To assist gasket 18 into proper alignment with plate 10', fixture 30 is preferable grit blasted in the area receiving the gasket or is coated with a known lubricious coating such as, for example, Teflon®. Once gasket 18 is in place on the fixture, plate 10' and fixture 30 are urged together to cement the gasket to the plate. Plate 10', including gasket 18, is removed from fixture 30 and the adhesive is air cured in known fashion to permanently bond the gasket to the plate, thereby forming gasketed bipolar plate 10.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. A method for laminating a gasket to a non-gasketed bipolar plate to form a gasketed bipolar plate for a proton-exchange membrane fuel cell, comprising the steps of
    a) providing a pattern of said gasket;
    b) coating an adhesive onto an area of said non-gasketed plate to be gasketed according to said gasket pattern;
    c) providing a fixture having a mirror-image representation of said area to be gasketed on said non-gasketed plate;
    d) positioning said gasket face-down on said fixture;
    e) entering said non-gasketed plate face down onto said gasket on said fixture to adhere said gasket thereto in said adhesive-coated areas;
    f) removing said non-gasketed plate and said adhered gasket from said fixture; and
    g) curing said adhesive to form said gasketed bipolar plate.

2. A method in accordance with claim 1 further comprising the step of coating a primer layer to said area of said non-gasketed plate to be gasketed according to said gasket pattern prior to coating said adhesive thereto.

3. A method in accordance with claim 2 further comprising the step of cleaning said non-gasketed plate prior to coating said primer layer.

4. A method in accordance with claim 2 further comprising the step of aging said primer layer before said adhesive coating step.

5. A method in accordance with claim 1 wherein said adhesive is coated onto said non-gasketed plate by screen printing.

6. A method in accordance with claim 1 further comprising the step of applying pressure to urge said gasket against said adhesive after said entering step.

7. A method in accordance with claim 1 wherein said bipolar plate comprises a graphite filled polymer.

8. A method in accordance with claim 1 wherein said bipolar plate comprises a metallic compound.

9. A method in accordance with claim 1 wherein said gasket comprises an elastomeric rubber.

10. A method in accordance with claim 1 wherein said adhesive comprises a screen printable polymer.

11. A method in accordance with claim 1 wherein said fixture further includes guide means for aligning said non-gasketed plate with said gasket.

12. A method for laminating a gasket to a non-gasketed bipolar plate to form a gasketed bipolar plate for a proton-exchange membrane fuel cell, comprising the steps of
    a) providing a pre-formed gasket having a gasket pattern;
    b) coating an adhesive onto an area of said non-gasketed plate to be gasketed according to said gasket pattern;
    c) providing a fixture having a mirror-image representation of said area to be gasketed on said non-gasketed plate;
    d) positioning said pre-formed gasket face-down on said fixture;
    e) entering said non-gasketed plate face down onto said pre-formed gasket on said fixture to adhere said pre-formed gasket thereto in said adhesive-coated areas;
    f) removing said non-gasketed plate and said adhered gasket from said fixture; and
    g) curing said adhesive to form said gasketed bipolar plate.

13. A method in accordance with claim 12 further comprising the step of coating a primer layer to said area of said non-gasketed plate to be gasketed according to said gasket pattern prior to coating said adhesive thereto.

14. A method in accordance with claim 13 further comprising the step of cleaning said non-gasketed plate prior to coating said primer layer.

15. A method in accordance with claim 13 further comprising the step of aging said primer layer before said adhesive coating step.

16. A method in accordance with claim 12 wherein said adhesive is coated onto said non-gasketed plate by screen printing.

17. A method in accordance with claim 12 further comprising the step of applying pressure to urge said gasket against said adhesive after said entering step.

* * * * *